US012138754B2

(12) United States Patent
Hsieh

(10) Patent No.: US 12,138,754 B2
(45) Date of Patent: Nov. 12, 2024

(54) COVERING STRUCTURE FOR WRENCH HEAD

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 347 days.

(21) Appl. No.: 17/809,119

(22) Filed: Jun. 27, 2022

(65) Prior Publication Data

US 2023/0001546 A1 Jan. 5, 2023

(30) Foreign Application Priority Data

Jul. 1, 2021 (TW) ................................ 110124223

(51) Int. Cl.
*B25B 23/00* (2006.01)
*B25B 13/46* (2006.01)

(52) U.S. Cl.
CPC ........ *B25B 23/0007* (2013.01); *B25B 13/463* (2013.01)

(58) Field of Classification Search
CPC ...... B25B 23/0007; B25B 13/463; B25F 5/02
See application file for complete search history.

(56) References Cited

U.S. PATENT DOCUMENTS

| | | | | | |
|---|---|---|---|---|---|
| 2,957,377 | A * | 10/1960 | Hare | B25B 13/463 81/63 |
| 4,934,220 | A * | 6/1990 | Slusar | B25B 13/463 81/63 |
| 5,157,994 | A * | 10/1992 | Krivec | B25B 13/463 81/63 |
| 6,758,641 | B2 * | 7/2004 | Hu | B25B 13/463 408/63 |
| 8,650,991 | B2 * | 2/2014 | Lin | B25B 13/463 81/62 |

* cited by examiner

*Primary Examiner* — David B. Thomas
(74) *Attorney, Agent, or Firm* — Wang Law Firm, Inc.

(57) ABSTRACT

A structure for mounting a cover plate in a head portion of a wrench is disclosed. An end surface of the head portion is concavely provided with a receiving chamber. The head portion is also concavely provided with a recess at the opening of the receiving chamber. The cover plate is mounted in the recess to close the receiving chamber, and the cover plate is fixed in the recess by the peripheral wall of the recess itself. In other words, the cover plate is mounted in the head portion of the wrench without using any connecting element and is fixed by the head portion of the wrench itself. The cover plate, once fixed, is kept from coming off so that the components mounted in the receiving chamber of the head portion will not fall out.

9 Claims, 9 Drawing Sheets

COVERING STRUCTURE FOR WRENCH HEAD

BACKGROUND OF THE INVENTION

1. Technical Field

The present invention relates to a wrench and more particularly to a covering structure for the head portion of a wrench.

2. Description of Related Art

Referring to FIG. 1 and FIG. 2 for a conventional wrench 10, the head portion 11 of the wrench 10 has a receiving chamber 12 mounted therein with a ratchet wheel 13 and an engaging member 14. The wrench 10 is a two-way ratchet wrench whose force application direction can be switched by moving the engaging member 14 to different positions with a push lever 15. The push lever 15 engages with the engaging member 14 elastically through a spring 151 and a steel ball 152.

The bottom side of the head portion 11 is mounted with a cover plate 16 so that components such as the ratchet wheel 13 and the engaging member 14 will not fall out of the receiving chamber 12. Conventionally, the cover plate 16 is connected to the head portion 11 by a connecting element such as a screw 17 or other fasteners.

While the wrench 10 is in use, however, the connecting element (e.g., the screw 17 or other fasteners) may get loose. Should that happen, the cover plate 16 may come off such that the ratchet wheel 13, the engaging member 14, the spring 151, and the steel ball 152 fall out. If any of those components falls out, the wrench 10 will be unusable, and the component that has fallen out may cause danger in an environment where high-precision machinery is used, e.g., may compromise the safety of an aircraft (e.g., airplane) or other apparatus or equipment that has high safety requirements. The issue to be addressed by the present invention is to prevent the components in the head portion of a wrench from falling out.

BRIEF SUMMARY OF THE INVENTION

The present invention aims to overcome the aforesaid drawbacks of the prior art, the primary objective being to provide a covering structure for a wrench head so that the cover plate at the head portion of a wrench will not come off.

To achieve the foregoing objective, the covering structure provided by the present invention for a wrench head includes the head portion of a wrench and a cover plate. The head portion has an end surface concavely provided with a receiving chamber. In addition, the head portion is concavely provided with a recess at the opening of the receiving chamber.

The cover plate is mounted in the recess to close the receiving chamber. The cover plate is fixed in the recess by the peripheral wall of the recess.

The cover plate is mounted in the head portion of the wrench without using any connecting element and is fixed by the head portion of the wrench itself. This design prevents the cover plate from coming off so that the components mounted in the receiving chamber of the head portion are kept from falling out.

In one embodiment of the present invention, the cover plate has a diameter slightly greater than the diameter of the recess, and a tight interference fit is formed between the peripheral surface of the cover plate and the peripheral wall of the recess.

In one embodiment of the present invention, one end of the cover plate is defined as a guiding end and has a relatively small diameter, which is less than the diameter of the recess, and the cover plate is mounted in the recess by first placing the guiding end into the recess. This design makes it easier to put the cover plate into the recess in order for a tight interference fit to be formed between the cover plate and the peripheral wall of the recess.

In one embodiment of the present invention, the guiding end of the cover plate has a periphery forming a guiding peripheral wall, and the guiding peripheral wall may be an inclined conical surface or a circularly curved conical surface.

In one embodiment of the present invention, the diameter of the recess is greater at the inner end of the recess than at the outer end of the recess to help prevent the cover plate from separating from the recess.

In one embodiment of the present invention, the hardness of the head portion is different from that of the cover plate, and the softer one of the head portion and the cover plate is more easily deformable than the other.

In one embodiment of the present invention, the peripheral wall of the recess has a shoulder rim at the outer opening of the recess, and the shoulder rim is pressed against the outer end surface of the cover plate to prevent the cover plate from coming off.

In one embodiment of the present invention, the diameter of the peripheral wall of the recess is reduced at the outer opening of the recess to form the shoulder rim, and the shoulder rim extends inward and is pressed against the outer end surface of the cover plate.

In one embodiment of the present invention, the thickness of the cover plate is slightly less than the depth of the recess such that a gap is formed between the outer end surface of the cover plate and the edge of the outer opening of the recess, and the shoulder rim is formed in the gap.

BRIEF DESCRIPTION OF THE SEVERAL VIEWS OF THE DRAWINGS

The above and other objectives, as well as the features and intended effects, of the present invention can be better understood by referring to the following detailed description in conjunction with the accompanying drawings, in which.

DETAILED DESCRIPTION OF THE INVENTION

Figure 1:
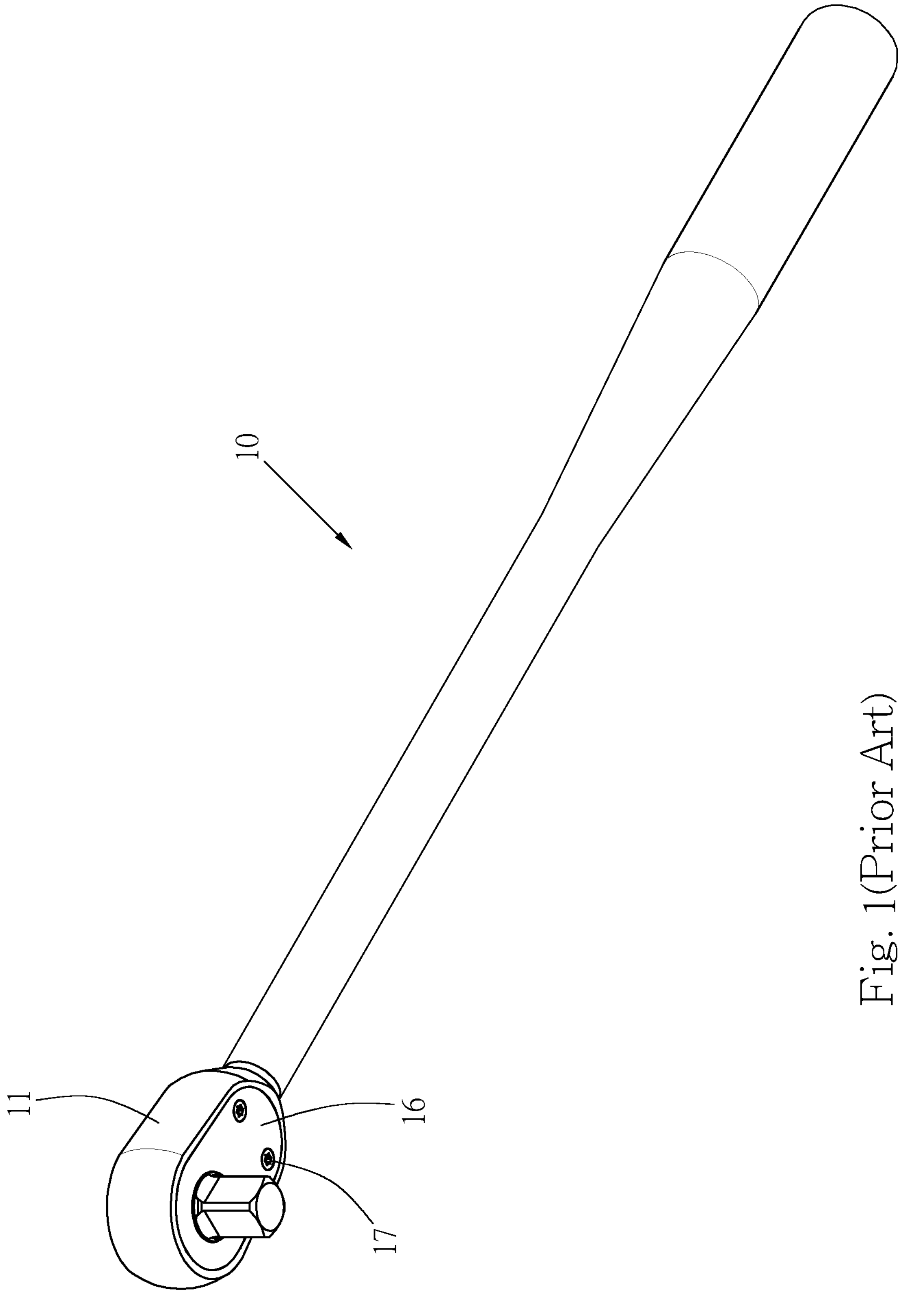
Fig. 1(Prior Art)
FIG. 1 is a bottom perspective view of a conventional wrench.
Figure 2:
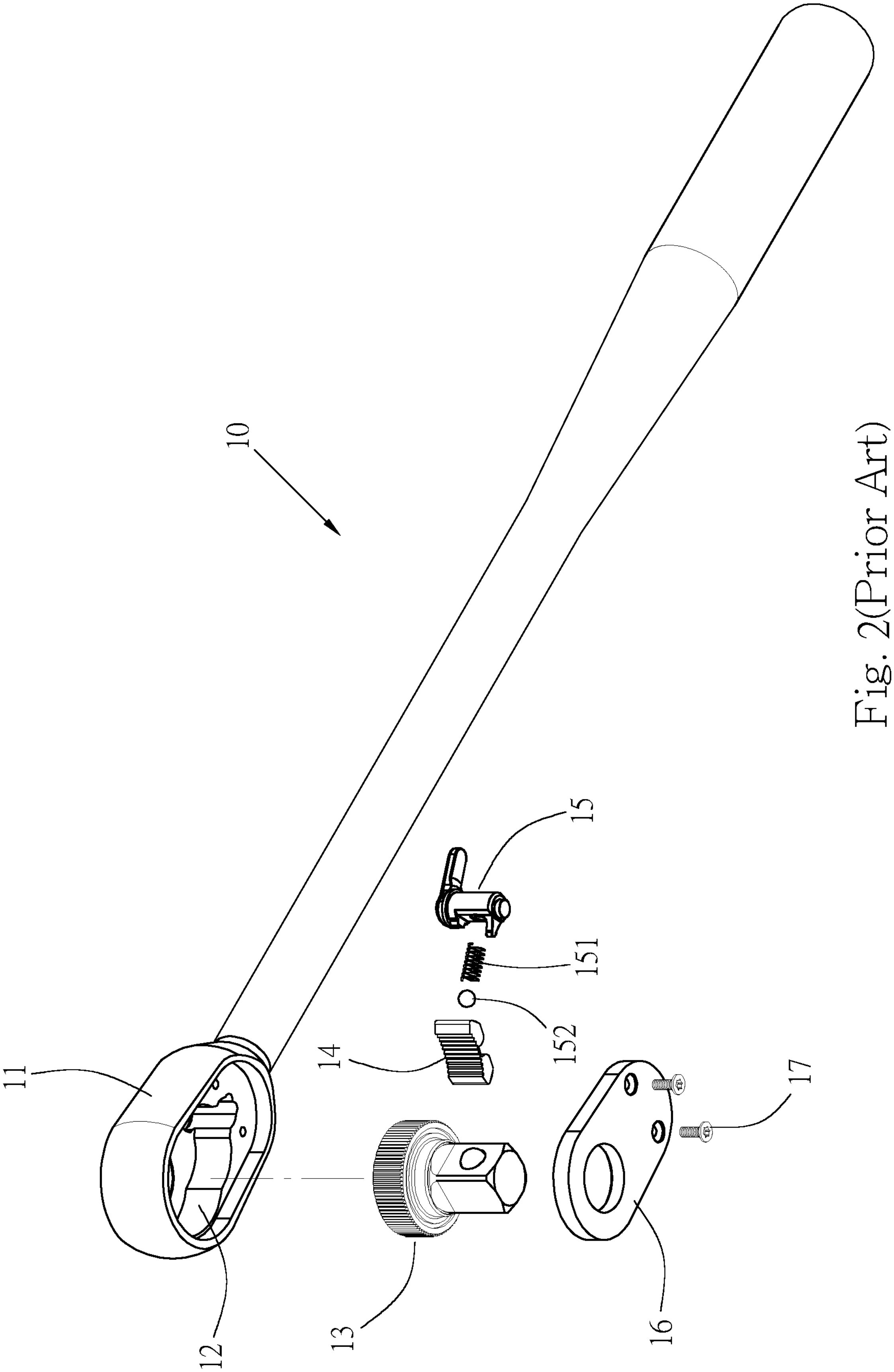
Fig. 2(Prior Art)
FIG. 2 is an exploded perspective view of the conventional wrench in FIG. 1.
Figure 3:
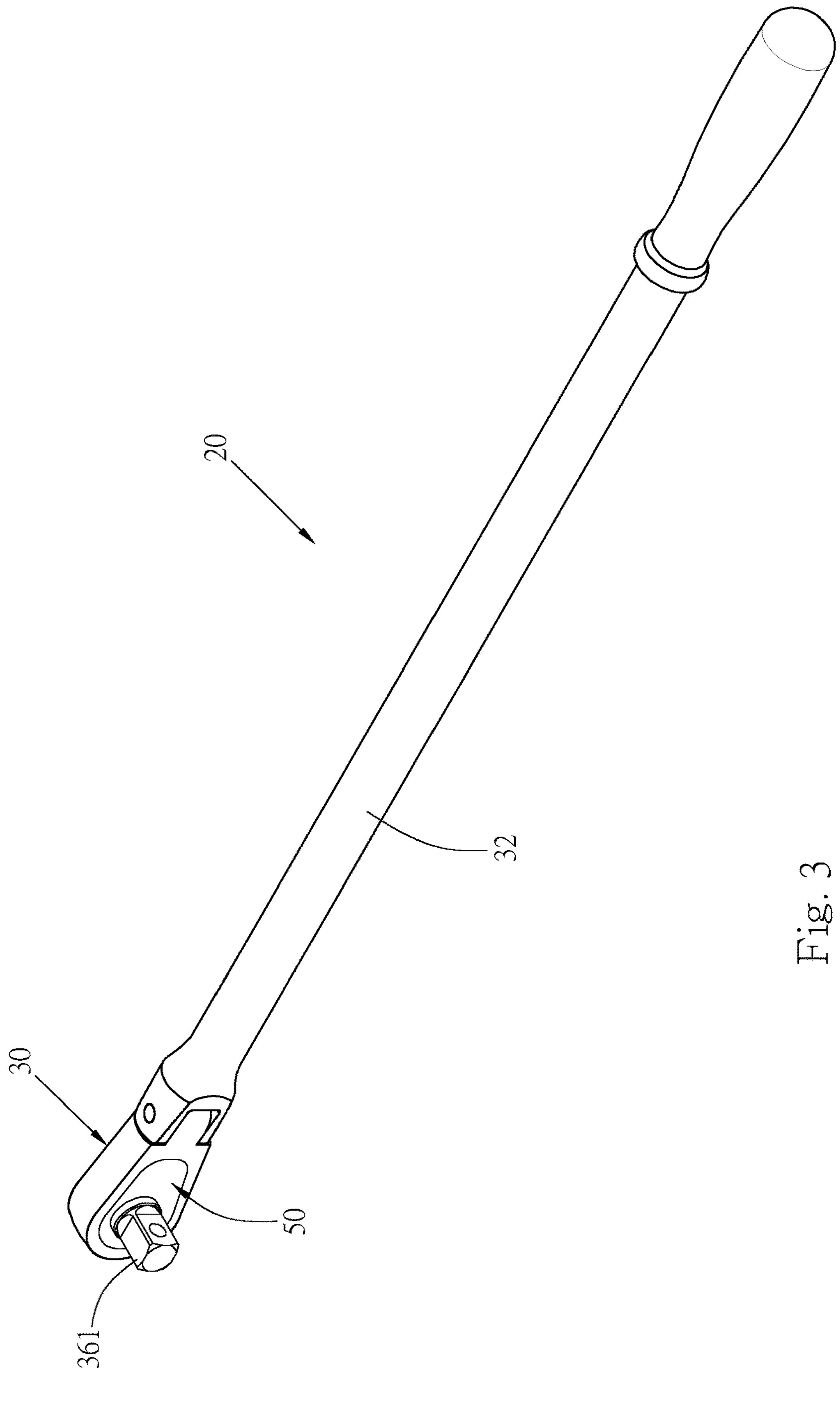
FIG. 3 is a bottom perspective view of a wrench to which the first preferred embodiment of the invention is applied.
Figure 4:
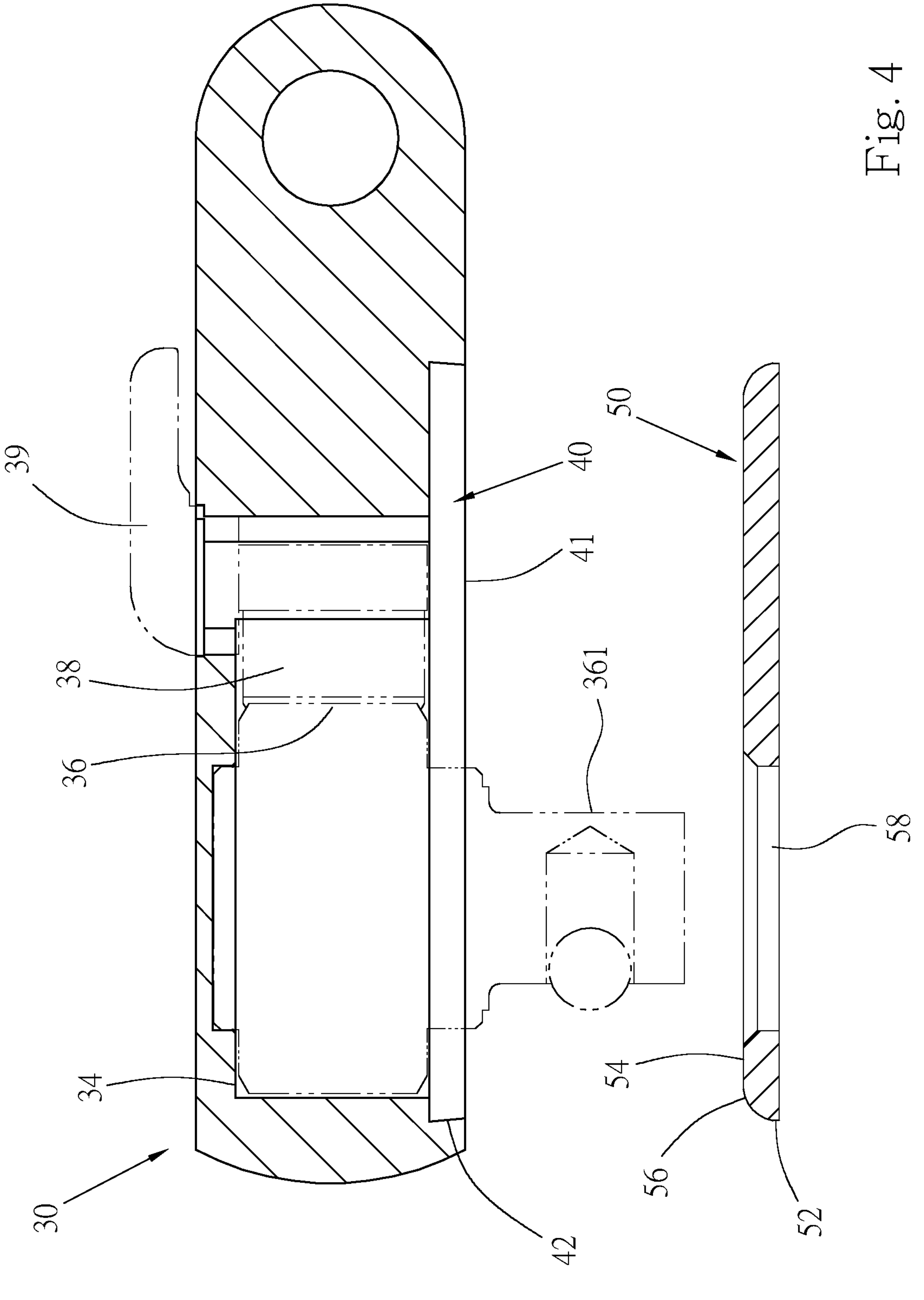
FIG. 4 is a sectional view, taken along the top-bottom direction, of the first preferred embodiment of the invention, i.e., of a head portion of the wrench and a cover plate.

Please refer to FIG. 3 and FIG. 4 for the covering structure for a wrench head according to the first preferred embodiment of the present invention. The embodiment is applied to a wrench 20, typically a ratchet wrench. The wrench 20 includes a head portion 30 and a rod 32. The head portion 30 and the rod 32 of the wrench 20 may be integrally formed as a single structure or, as shown in the drawings, be pivotally connected together to allow the angle between the head portion 30 and the rod 32 to be adjusted. An end surface (e.g., the end surface at the bottom end) of the head portion 30 is concavely provided with a receiving chamber 34. The receiving chamber 34 is mounted therein with a ratchet wheel 36, an arresting member 38, a push lever 39, an elastic element, and a steel ball. The opening of the receiving chamber 34 is covered with a cover plate 50. The ratchet wheel 36, the arresting member 38, the push lever 39, the elastic element, and the steel ball are respectively identical to the ratchet wheel 13, the engaging member 14, the push lever 15, the elastic element 151, and the steel ball 152 in FIG. 2, do not constitute the subject matter of the invention, and therefore will not be described in more detail.

The aforesaid end surface (e.g., the end surface at the bottom end) of the head portion 30 is also concavely provided with a recess 40 at the opening of the receiving chamber 34 in order for the cover plate 50 to be placed in the recess 40.

In this embodiment, as shown in FIG. 4, the recess 40 has a diameter (or width) that is greater at the inner end of the recess 40 than at the outer end of the recess 40; that is to say, the diameter/width of the recess 40 is smaller at the outer opening 41 of the recess 40 than inside the recess 40. In this embodiment, the peripheral wall 42 of the recess 40 is conical and has a diameter/width that is gradually reduced outward. It should be pointed out that the peripheral wall 42 of the recess 40 may be a vertical wall and is not required to be inclined. The term "diameter" or "width" is used herein to refer to a dimension of the recess 40 or the cover plate 50 that extends in a transverse direction.

The diameter/width of the peripheral surface 52 of the cover plate 50 is slightly greater than the diameter/width of the recess 40. One end of the cover plate 50 is defined as a guiding end 54 and has a relatively small diameter/width. The diameter/width of the guiding end 54 is less than the diameter/width of the recess 40. The periphery of the guiding end 54 forms a guiding peripheral wall 56. The guiding peripheral wall 56 may be an inclined conical surface or a circularly curved conical surface. A through hole 58 is provided in the cover plate 50 so that a columnar portion 361 of the ratchet wheel 36 can extend out through the through hole 58.

Figure 5:
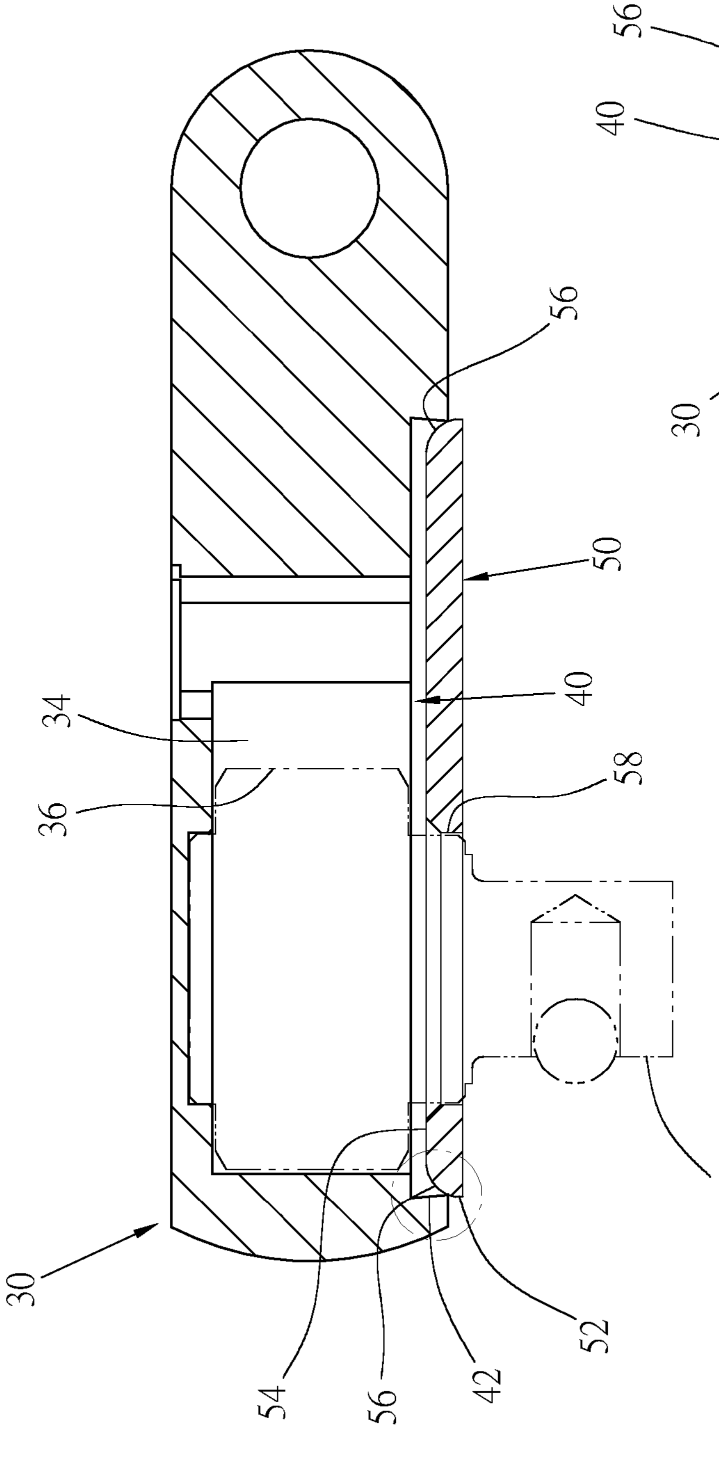
FIG. 5 is similar to FIG. 4 except that the cover plate is being mounted into a recess of the head portion.
Figure 6:
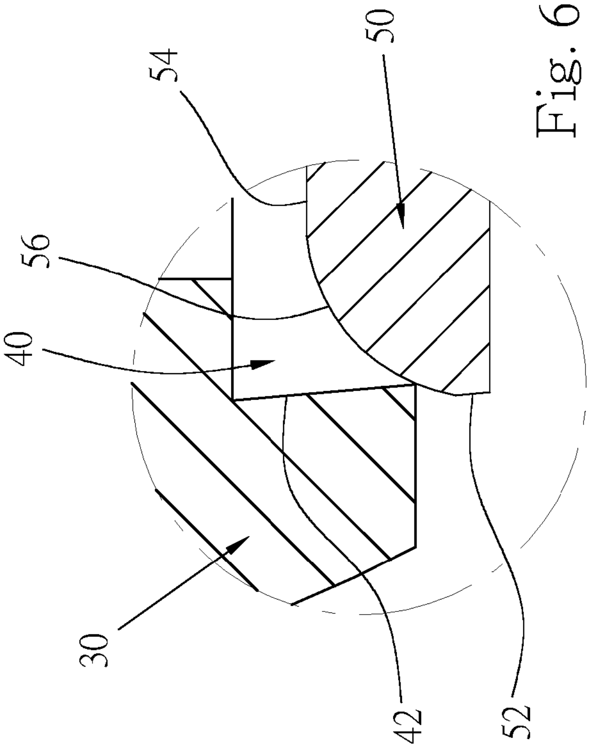
FIG. 6 is a partial enlarged view of FIG. 5.

Referring to FIG. 5 and FIG. 6, the cover plate 50 is mounted in the recess 40 of the head portion 30 to close the receiving chamber 34. The mounting process is carried out with the guiding end 54 of the cover plate 50 facing the recess 40. As the diameter of the guiding end 54 is less than the diameter of the recess 40, the cover plate 50 can easily have one end (i.e., the guiding end 54) extending into the recess 40.

Figure 8:
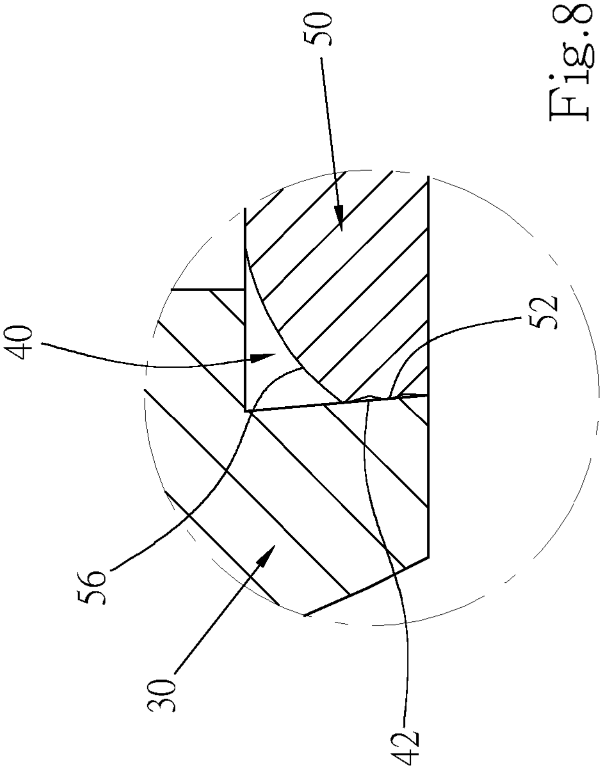
FIG. 8 is a partial enlarged view of FIG. 7.
Figure 7:
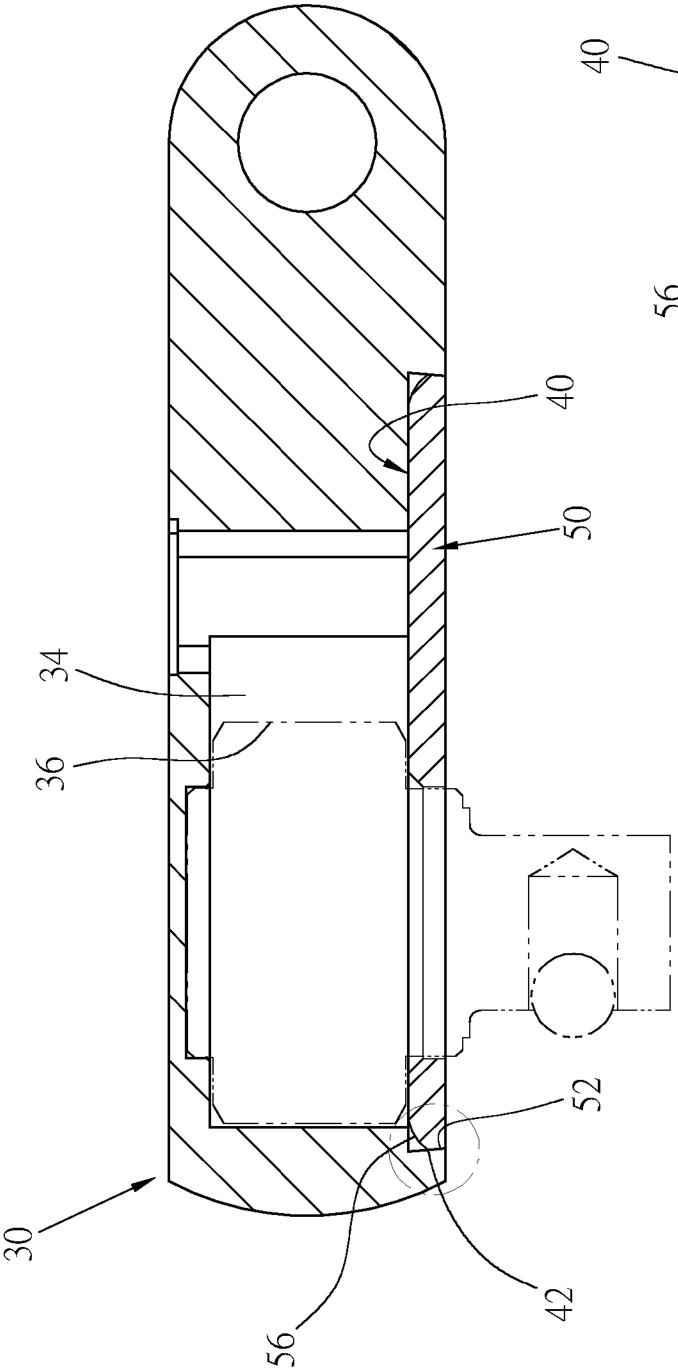
FIG. 7 is similar to FIG. 5 except that the cover plate has been mounted in the recess of the head portion.

Next, referring to FIG. 7 and FIG. 8, a pressure or impact force is applied to the cover plate 50 in order to squeeze the cover plate 50 into the recess 40 and thereby couple the cover plate 50 and the recess 40 together. When the cover plate 50 is being squeezed into the recess 40, at least one of the peripheral surface 52 of the cover plate 50 and the peripheral wall 42 of the recess 40 is deformed to form a tight interference fit between the peripheral surface 52 of the cover plate 50 and the peripheral wall 42 of the recess 40, thereby fixing the cover plate 50 in the recess 40. Consequently, the cover plate 50 is kept from separating from the head portion 30, and the components in the receiving chamber 34 are thus prevented from falling out.

In this embodiment, the diameter of the recess 40 is greater at the inner end of the recess 40 than at the outer end of the recess 40, and this configuration is effective in preventing the cover plate 50 from separating from the recess 40. According to the results of tests conducted by the applicant, the cover plate 50 will not separate from the recess 40 even after the wrench 20 is damaged from use.

The head portion 30 and the cover plate 50 may be respectively made of materials of different hardnesses. For example, one of the head portion 30 and the cover plate 50 is made of iron while the other is made of aluminum or copper (i.e., the metal of which the head portion 30 is made has a different hardness from that of the metal of which the cover plate 50 is made); thus, when the cover plate 50 is squeezed into the recess 40, the softer one of the head portion 30 and the cover plate 50 will be more easily deformed, producing a tighter coupling effect than if the head portion 30 and the cover plate 50 are of the same hardness.

Figure 9:
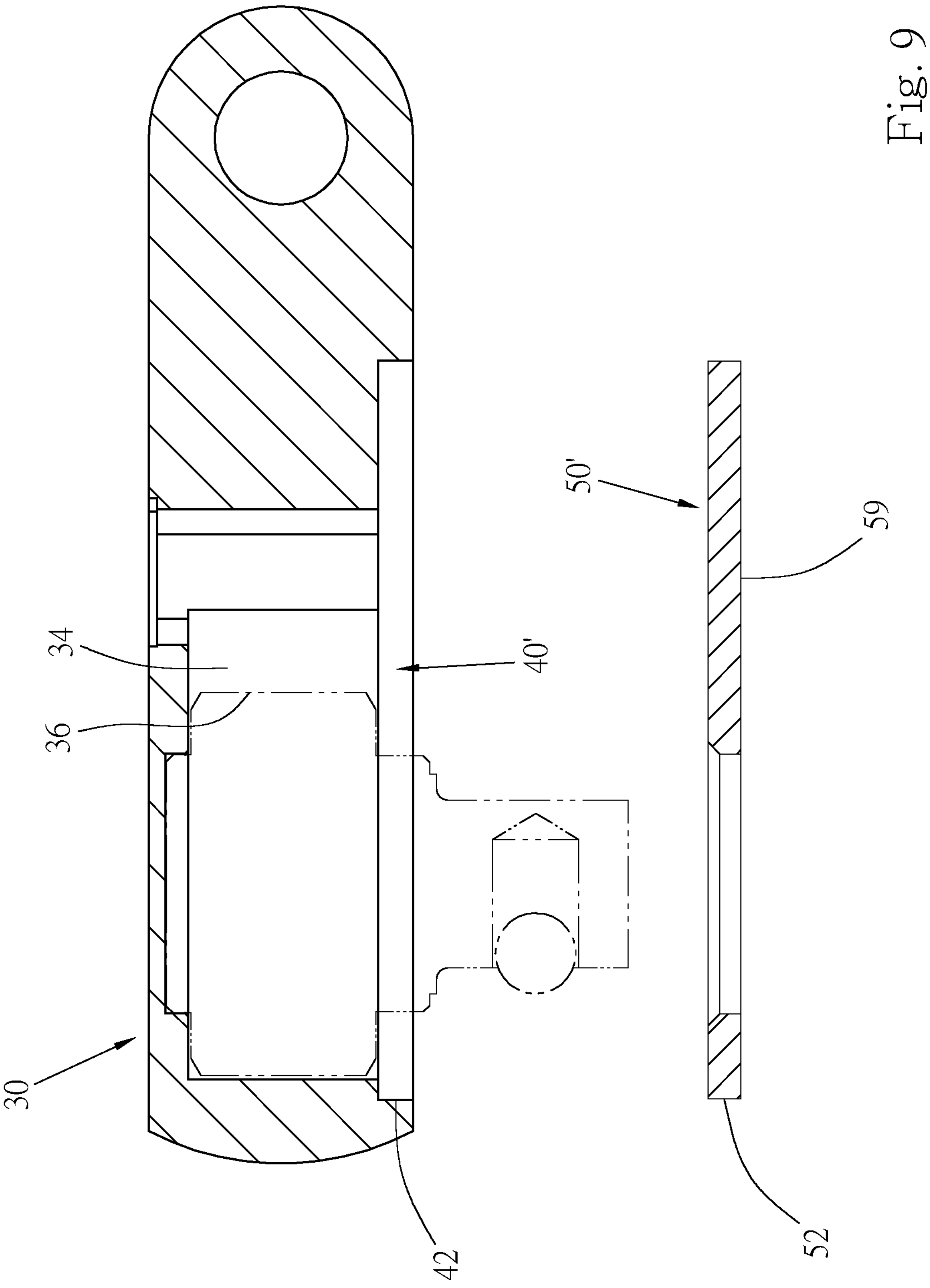
FIG. 9 is a sectional view, taken along the top-bottom direction, of the second preferred embodiment of the invention, i.e., of a head portion of a wrench and a cover plate.

FIG. 9 shows the covering structure for a wrench head according to the second preferred embodiment of the present invention. The same components in the first and the second preferred embodiments are indicated by the same reference numeral, and the structures of such components in the second preferred embodiment can be known from the first preferred embodiment and therefore will not be described repeatedly. The wrench 20' includes a head portion 30 and a cover plate 50'. The head portion 30 is concavely provided with a receiving chamber 34 and a recess 40' as in the first preferred embodiment. The cover plate 50' is mounted in the recess 40'.

The diameter/width of the cover plate 50' is approximately equal to but not greater than the diameter/width of the recess 40' so that the cover plate 50' can be placed into the recess 40' without being squeezed. The peripheral surface 52 of the cover plate 50' is adjacent to the peripheral wall 42 of the recess 40'. The peripheral wall 42 of the recess 40' and the peripheral surface 52 of the cover plate 50' may be vertical walls or inclined walls, and in the latter case, the diameter/width of the recess 40' is greater at the inner end of the recess 40' than at the outer end of the recess 40'.

Figure 10:
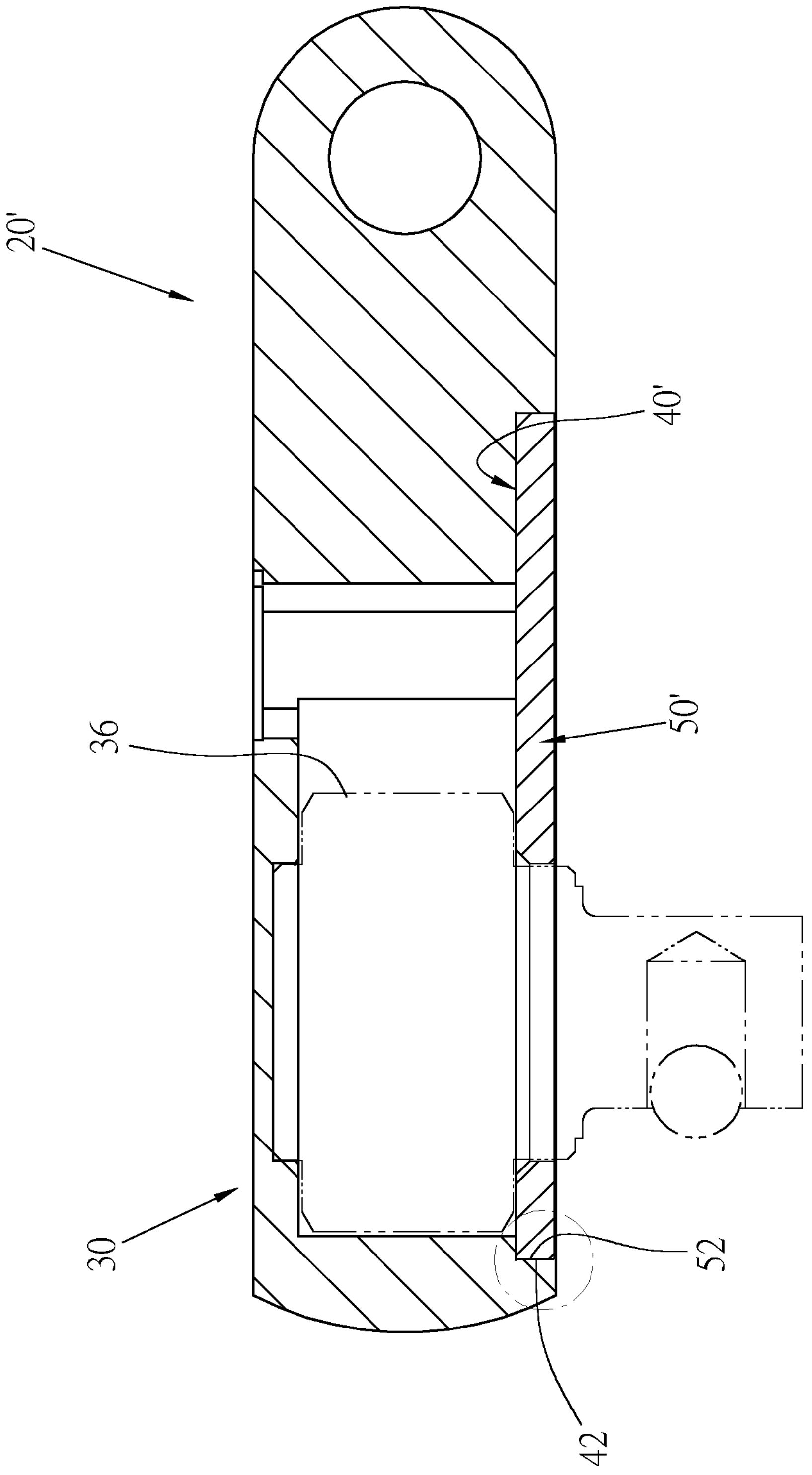
FIG. 10 is similar to FIG. 9 except that the cover plate has been placed in a recess of the head portion.
Figure 11:
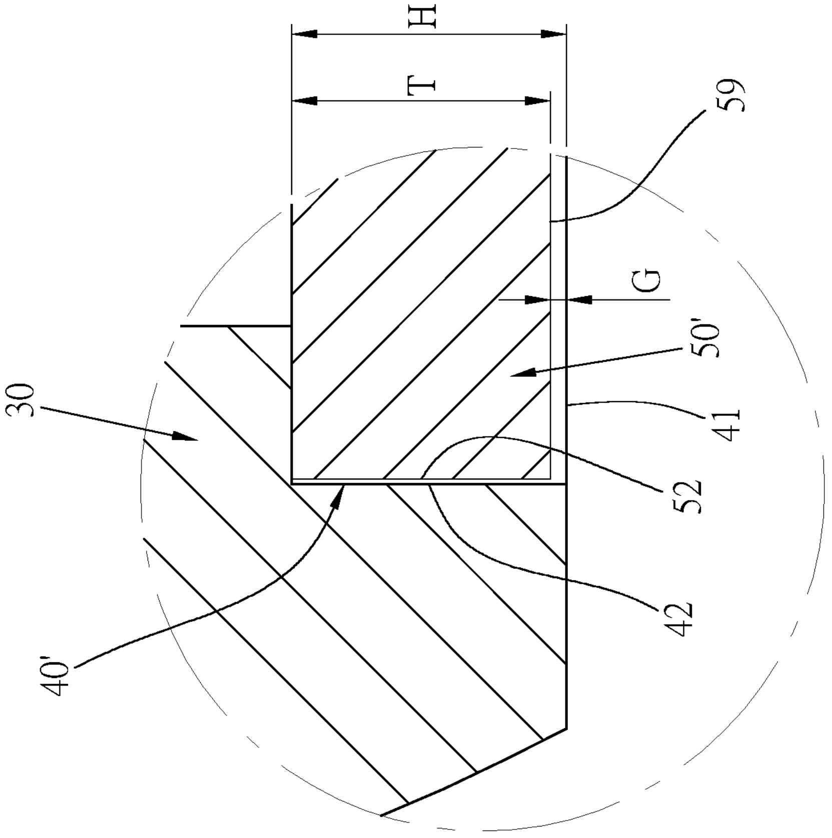
FIG. 11 is a partial enlarged view of FIG. 10.

Referring to FIG. 10 and FIG. 11, the thickness T of the cover plate 50' is preferably slightly less than the depth H of the recess 40' such that a gap G is formed between the outer end surface 59 of the cover plate 50' (i.e., the bottom surface of the cover plate 50' shown in FIG. 11) and the edge of the outer opening 41 of the recess 40' after the cover plate 50' is placed in the recess 40'.

Figure 12:
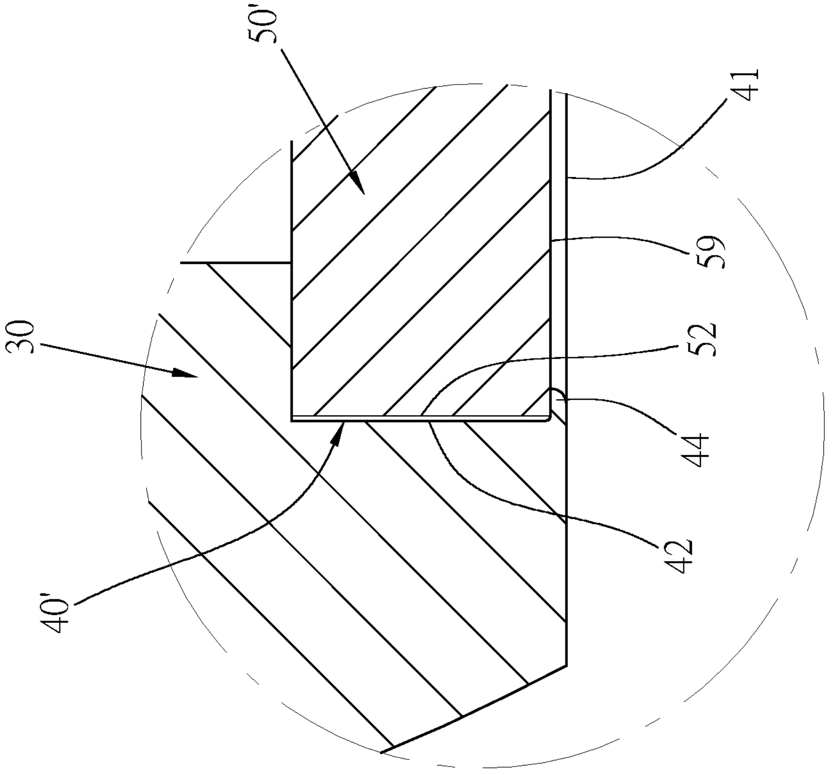
FIG. 12 shows how the cover plate in FIG. 11 is fixed by a method similar to riveting.

Once the cover plate 50' is placed in the recess 40', the portion of the peripheral wall 42 of the recess 40' that is at the outer opening 41 is pushed/squeezed with a proper machine or tool in order to reduce the diameter/width of the outer opening 41 by forming that portion of the peripheral wall 42 of the recess 40' into a shoulder rim 44 that extends inward and lies in the gap G, as shown in FIG. 12. The shoulder rim 44 extends to, partially wraps, and is pressed against the outer end surface 59 of the cover plate 50' such that the cover plate 50' is fixed in the recess 40'.

The technical means of the present invention are such that the cover plate 50, 50' is fixed in place directly by the wall of the recess 40, 40' of the head portion 30. In the first preferred embodiment, a tight interference fit is formed between the peripheral wall 42 of the recess 40 and the peripheral surface 52 of the cover plate 50; in the second preferred embodiment, the shoulder rim 44 of the peripheral wall 42 of the recess 40' is pressed against the outer end surface 59 of the cover plate 50'. Thus, the cover plate 50, 50' is mounted in the head portion 30 of the wrench without using any connecting element and is fixed by the recess 40, 40' of the head portion 30 of the wrench itself to eliminate the prior art problem that a connecting element may get loose. Moreover, the invention can effectively prevent the cover plate from coming off so that the components mounted in the head portion will not fall out. This helps ensure the safety of the environment in which the wrench is used, lest any equipment that has high safety requirements (e.g., an airplane) be endangered by a detached component. The invention, therefore, has overcome the aforesaid drawbacks of the prior art.

The embodiments disclosed herein serve only to expound, but not to limit, the technical features of the present invention. Any equivalent modification that is based on the invention shall fall within the scope of the patent protection sought by the applicant.

What is claimed is:

1. A covering structure for a wrench head, comprising:

a head portion of a wrench, wherein the head portion has an end surface concavely provided with a receiving chamber, and the head portion is concavely provided with a recess at an opening of the receiving chamber; and a cover plate having a peripheral surface, wherein the cover plate is mounted in the recess to close the receiving chamber, and the cover plate has a diameter slightly greater than a diameter of the recess;

the covering structure being characterized in that the cover plate is not fixed by any connecting element but is fixed in the recess by a peripheral wall of the recess, and a tight interference fit is formed between the peripheral surface of the cover plate and the peripheral wall of the recess.

2. The covering structure for the wrench head as claimed in claim 1, wherein the cover plate has an end defined as a guiding end and having a relatively small diameter, the diameter of the guiding end is less than the diameter of the recess, and the cover plate is mounted in the recess by first placing the guiding end into the recess.

3. The covering structure for the wrench head as claimed in claim 2, wherein the guiding end has a periphery forming a guiding peripheral wall, and the guiding peripheral wall is an inclined conical surface or a circularly curved conical surface.

4. The covering structure for the wrench head as claimed in claim 1, wherein the diameter of the recess is greater at an inner end of the recess than at an outer end of the recess.

5. The covering structure for the wrench head as claimed in claim 1, wherein the head portion and the cover plate differ from each other in hardness.

6. The covering structure for the wrench head as claimed in claim 1, wherein the cover plate has an outer end surface facing outward, the peripheral wall of the recess has a shoulder rim at an outer opening of the recess, and the shoulder rim is pressed against the outer end surface of the cover plate.

7. The covering structure for the wrench head as claimed in claim 6, wherein a diameter of the peripheral wall of the recess is reduced at the outer opening of the recess to form the shoulder rim, and the shoulder rim extends inward.

8. The covering structure for the wrench head as claimed in claim 6, wherein the cover plate has a thickness slightly less than a depth of the recess, a gap is formed between the outer end surface of the cover plate and an edge of the outer opening of the recess, and the shoulder rim is formed in the gap.

9. The covering structure for the wrench head as claimed in claim 6, wherein the diameter of the recess is greater than the diameter of the cover plate.

* * * * *